(12) United States Patent
Golle et al.

(10) Patent No.: US 8,625,136 B2
(45) Date of Patent: Jan. 7, 2014

(54) METHOD FOR DIRECT TRANSFER FROM A PORTABLE DEVICE TO A SCANNING DEVICE USING OPTICAL CODES

(75) Inventors: Philippe J. P. Golle, San Francisco, CA (US); James M. A. Begole, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 351 days.

(21) Appl. No.: 13/045,395

(22) Filed: Mar. 10, 2011

(65) Prior Publication Data

US 2012/0229843 A1    Sep. 13, 2012

(51) Int. Cl.
*G06F 15/00*    (2006.01)
(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

2005/0199699 A1*   9/2005   Sato et al. ..................... 235/375

* cited by examiner

*Primary Examiner* — Saeid Ebrahimi Dehkordy
(74) *Attorney, Agent, or Firm* — Shun Yao; Park, Vaughan, Fleming the Dowler LLP

(57) ABSTRACT

One embodiment provides a system for transferring a file from a portable device to a scanning device. During operation, the system displays an optical code associated with the file on the portable device. Next, the system detects successful scanning of the current optical code by the scanning device. Subsequently, the system displays a next optical code associated with the file on the portable device, thereby allowing the scanning device to decode the file after a sequence of optical codes are scanned.

20 Claims, 5 Drawing Sheets

METHOD FOR DIRECT TRANSFER FROM A PORTABLE DEVICE TO A SCANNING DEVICE USING OPTICAL CODES

BACKGROUND

1. Field

The present disclosure relates generally to communication among peripheral devices. More specifically, the present disclosure relates to a method and system for transferring documents from a portable device to a scanning device using optical codes.

2. Related Art

The proliferation of portable devices is changing the way people work. For example, people receive emails with document attachments that can include large documents, presentation slides, and schedules. Typically, such attachments are difficult to read on the portable device because of limited screen sizes. At the same time, printing from the portable device is difficult for several reasons. The portable device might not have enough memory or computing power to support printer drivers. A printer driver designed for the operating system on the portable device might not be available. The portable device is often required to discover nearby printers in a new environment, which can be time-consuming and might not always be successful. Furthermore, the portable device might not have secure network access to the printer, thus introducing security concerns in the printing process.

Current solutions to printing from a portable device are complicated. A portable device must follow a complicated series of steps, including discovering the printer, downloading software drivers, creating an account, uploading documents, logging into the printer, and selecting documents. In addition, printing from a portable device requires new, costly and/or retrofitted hardware, such as Bluetooth®, WiFi®, RFID, NFC, USB, and lrDA.

SUMMARY

One embodiment provides a system for transferring a file from a portable device to a scanning device. During operation, the system displays an optical code associated with the file on the portable device. Next, the system detects successful scanning of the current optical code by the scanning device. Subsequently, the system displays a next optical code associated with the file on the portable device, thereby allowing the scanning device to decode the file after a sequence of optical codes are scanned.

In some embodiments, the system generates the sequence of optical codes for the file.

In some embodiments, the system detects successful scanning of the current optical code by waiting for the scanning device for a specified time period before displaying the next optical code by the portable device.

In some embodiments, the system detects successful scanning of the current optical code by detecting passing of a scanner head with a light sensor on the portable device.

In some embodiments, the system detects successful scanning of the current optical code by detecting passing of a scanner head with a touch screen on the portable device.

In some embodiments, the system detects successful scanning of the current optical code by allowing the scanning device to notify a user to operate the portable device to display the next optical code.

In some embodiments, the file is encoded in a Uuencode or multi-part Multipurpose Internet Mail Extensions (MIME) format.

In some embodiments, the optical code is a QR Code.

In some embodiments, the scanning device comprises a printer.

BRIEF DESCRIPTION OF THE FIGURES

In the figures, like reference numerals refer to the same figure elements.

DETAILED DESCRIPTION

Figure 1:
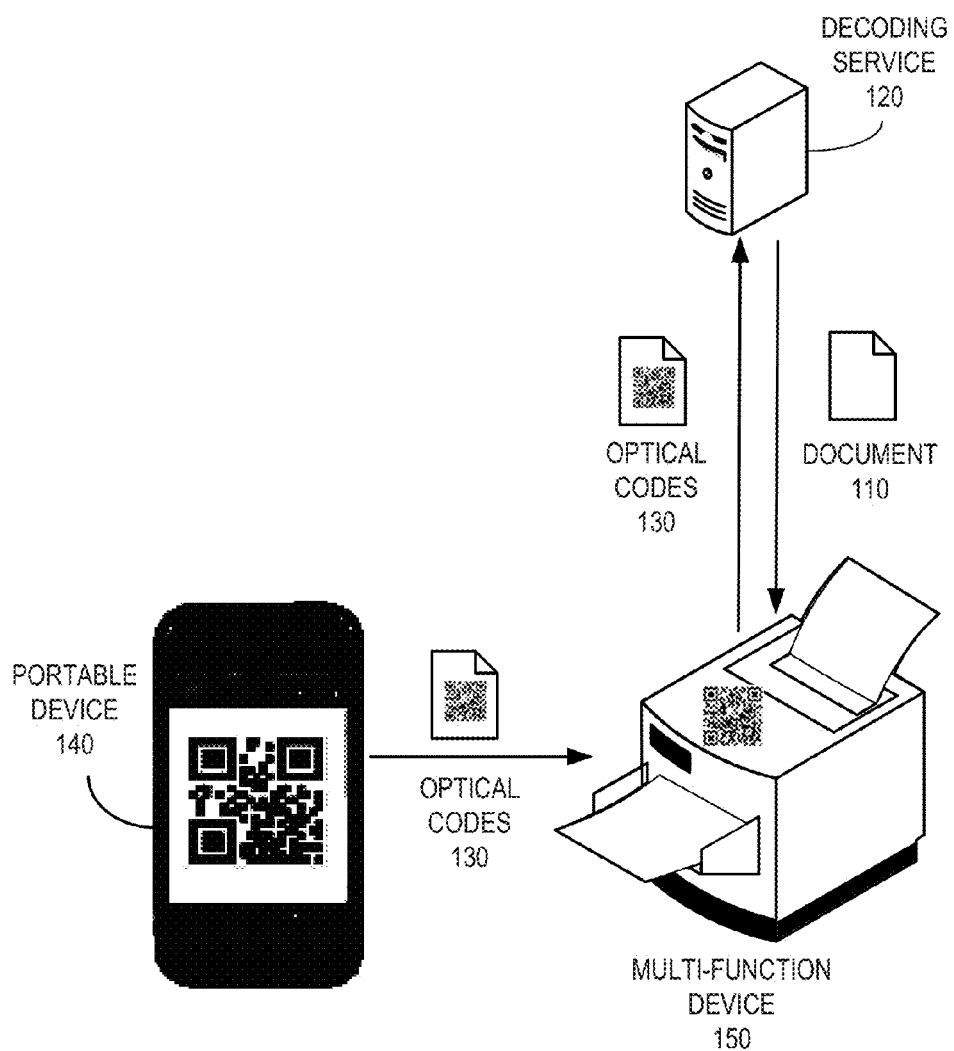
FIG. 1 illustrates an exemplary system for direct transfer of documents from a portable device to a multi-function device, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of printing a document from a portable device by displaying one or more optical codes on the portable device. The user can display the optical code to a scanner associated with a printer, which in turn can scan and recognize the optical code. Based on the information contained in the optical code, the printer (or a computer associated with the printer) can then receive the document and print the document.

This basic idea of using a sequence of optical codes to transfer a document from a portable device to a multi-function device for printing can be applied in different computing environments. One such example is illustrated by the system shown in FIG. 1, which facilitates direct transfer of documents from a portable device to a multi-function device in accordance with an embodiment. In this example, the user of a portable device 140 places the portable device's screen, which is displaying a sequence of optical codes 130 that encode a document, on the flatbed scanner of a multi-function device (MFD) 150. MFD 150 scans the optical codes 130 from the portable device's screen. Portable device 140 then displays the next optical code associated with the file when it senses that MFD 150 has finished scanning the current optical code. After MFD 150 has successfully scanned the sequence of optical codes, it sends optical codes 130 to a decoding service 120, and retrieves document 110 from decoding service 120. Subsequently, MFD 150 prints document 110.

In this example, optical codes 130 can be any optical representation of information that can be captured and recognized by any optical-sensing device, such as a scanner or digital camera. Typical optical codes include, but are not limited to: one-dimensional barcodes, two-dimensional barcodes (also called matrix codes, such as the "Quick Response" or "QR" codes), and data glyphs. The encoding of the digital content in the optical code follows well-known techniques such as Unix-to-Unix encoding (Uuencoding) or multipart Multipurpose Internet Mail Extensions (MIME) protocols, which define the sets of text symbols and boundaries within message bodies that represent binary data for transmission.

Decoding service 120 can be provided by a separate server, or by MFD 150 itself. In addition, MFD 150 can also be a conventional printer coupled to a computer which is also coupled to a scanner. The computer and scanner jointly perform the scanning and decoding.

The document transferring and print system illustrated in the example in FIG. 1 offers several benefits. First, portable device 140 does not require network access. As long as the user of portable device 140 can visually locate a printer and display optical codes 130 to the associated scanner, the document transfer and printing can be performed. Furthermore, the system supports all portable devices and can be modified to work on portable devices with the few features. In addition, the optical codes that encode the document can also serve the purpose of identification and authentication for printing.

Note that this disclosure uses the term "document optical code" interchangeably with "optical code." Furthermore, the terms "printer" and "multi-function device" are also used interchangeably in this disclosure. Functions, methods, and operations described in this disclosure to be performed by a scanner or an MFD can also be performed by a computer associated with the scanner or MFD.

Detecting a Successful Scan

In the exemplary document-printing system illustrated in FIG. 1, the document to be printed is encoded in the optical codes. There is always a limit on how much information one optical code may contain. The limit depends on the resolution of the display, as well as the resolution of the scanner. For example, an optical code with blocks of 4×4 pixels can be scanned with reasonable accuracy from the screen of a Black-Berry® phone. Since the resolution of the screen is 320 by 240 pixels, each scan transfers approximately 320×240/16=4800 bits of information to the scanner. Note that error corrections may further reduce this number. In many cases, files are much larger than the data size a single optical code can carry and have to be encoded in multiple optical codes. Therefore, to print a large file, the portable device typically displays a sequence of optical codes so that the scanner can decode the file after scanning each of the optical codes successfully.

After the portable device displays an optical code to the scanner, the portable device ideally determines when the scanner has completed the scanning. Thus, the portable device can continue displaying the next optical code in the sequence until all the optical codes that encode the file have been scanned. Multiple means can be employed for the portable device to detect a successful scan.

In one embodiment, the portable device may simply display optical codes in the sequence one by one. While displaying each optical code, the portable device waits a specific period before proceeding to the next optical code. The MFD scans at a regular speed until all the optical codes have been acquired. A second pass may be necessary if some of the optical codes are missing from the first scanning session.

In another embodiment, with each display of an optical code, the MFD may notify the user of the scan result. The user can operate the portable device to display the current optical code or the next optical code.

Many smartphones, such as the iPhone 3G, have light sensors that can detect the passing of the light bar of an MFD as the illuminated light bar slides under the phone's display. When the phone detects the passing of the light bar, it may display the next optical code in the sequence.

An increasing number of portable devices now use capacitive sensors in their touch screens (e.g., the iPhone 3G). Capacitive sensors by design detect the disruption of an electrical field from a conductor, such as a human finger. The metal in an MFD light bar can also be sensed as the light bar slides under the touch screen. Similarly, when the phone detects the passing of the light bar, it may display the next optical code in the sequence.

System Operation

Figure 2:
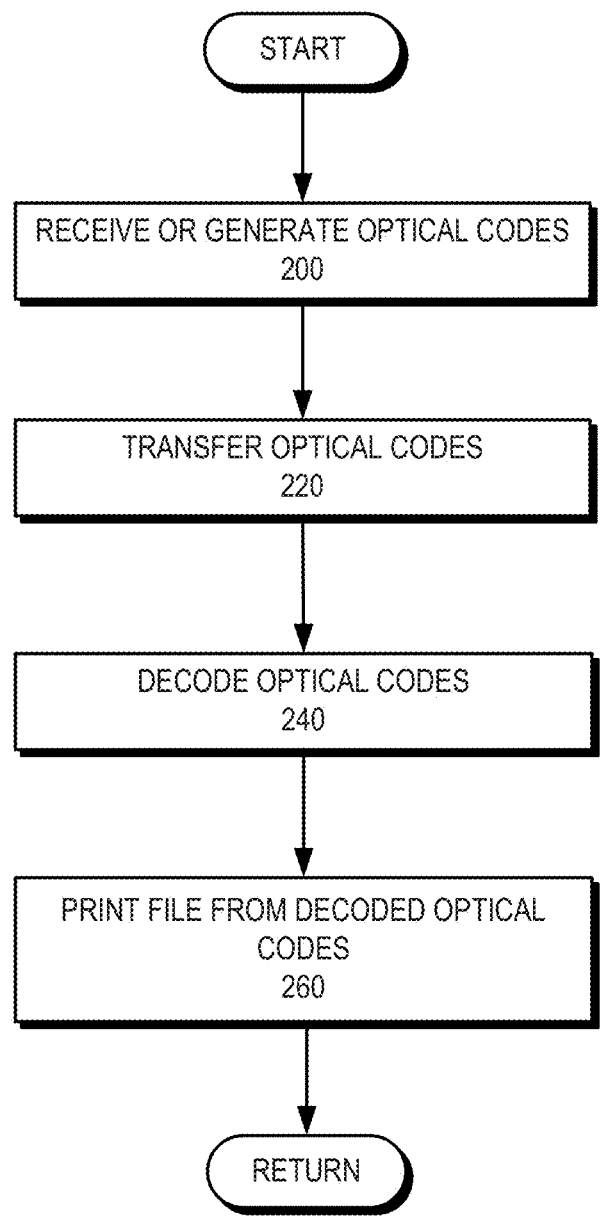
FIG. 2 presents a flow chart illustrating the process of transferring a document from a portable device to a multi-function device, in accordance with an embodiment of the present invention.

FIG. 2 presents a flow chart illustrating the process of transferring a document from a portable device to a multi-function device in accordance with an embodiment. During operation, the portable device receives or generates a sequence of optical codes that encode a document to be printed (operation 200). The portable device then transfers the optical codes to the MFD (operation 220). Subsequently, the optical codes are decoded (operation 240). Next, the MFD prints the document based on the decoded optical codes (operation 260). Note that the portable device may also encode the file in a sequence of optical codes itself instead of receiving the optical codes from an encoding service.

Figure 3:
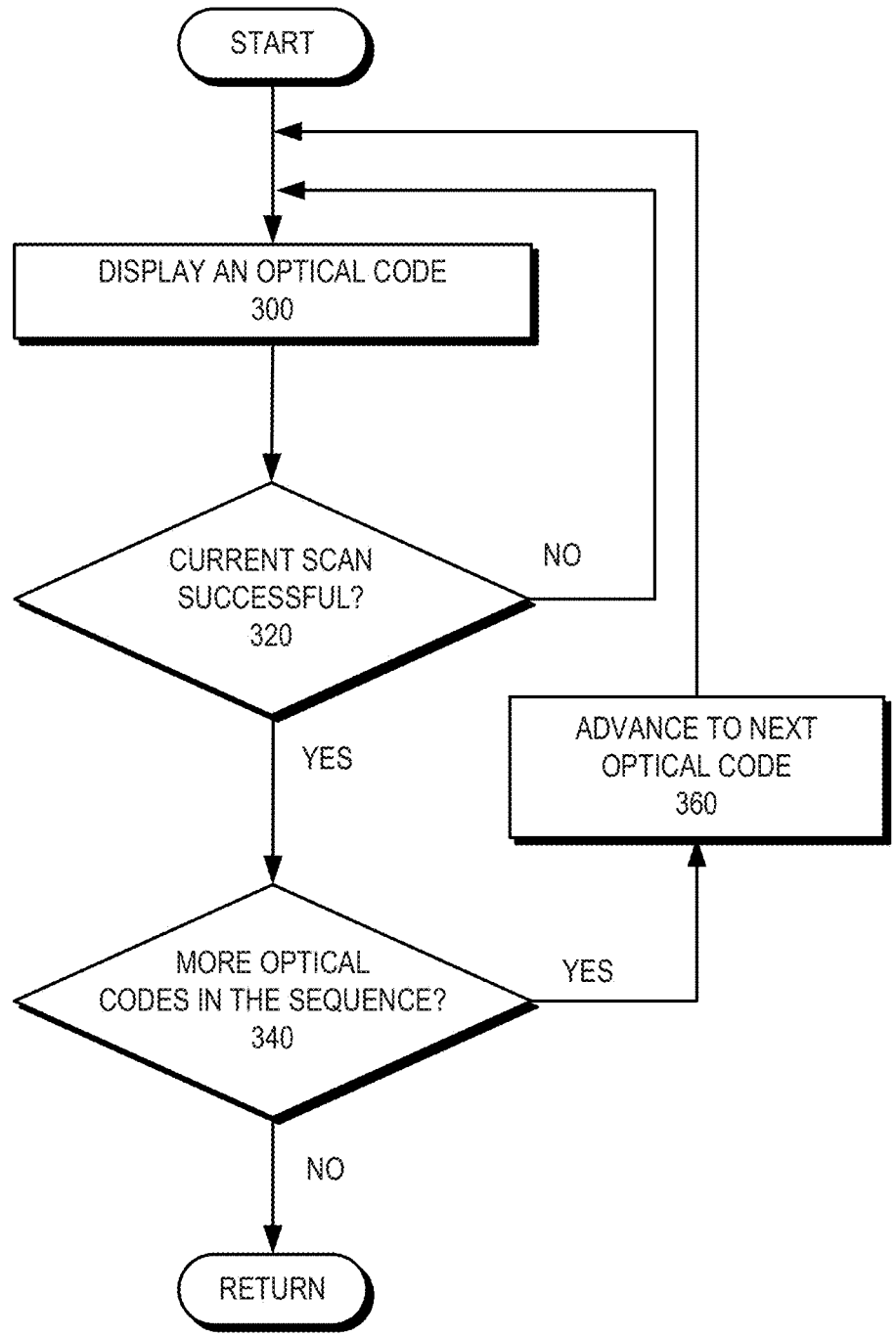
FIG. 3 presents a flow chart illustrating the process of transferring optical codes from a portable device to a multi-function device, in accordance with an embodiment of the present invention.

FIG. 3 presents a flow chart illustrating the process of transferring the optical codes from the portable device to the MFD in accordance with an embodiment. During operation, the portable device displays an optical code to the scanner of the MFD (operation 300). The portable device then determines whether the scanner has successfully scanned the current optical code (operation 320). If not, the portable device continues displaying the current optical code and waits for the scanner to complete the scanning process. Otherwise, the portable device further determines if there are more optical codes in the sequence (operation 340). If so, the portable device advances to the next optical code (operation 360), and displays the optical code (operation 300). Otherwise, the transferring process is complete.

Figure 4:
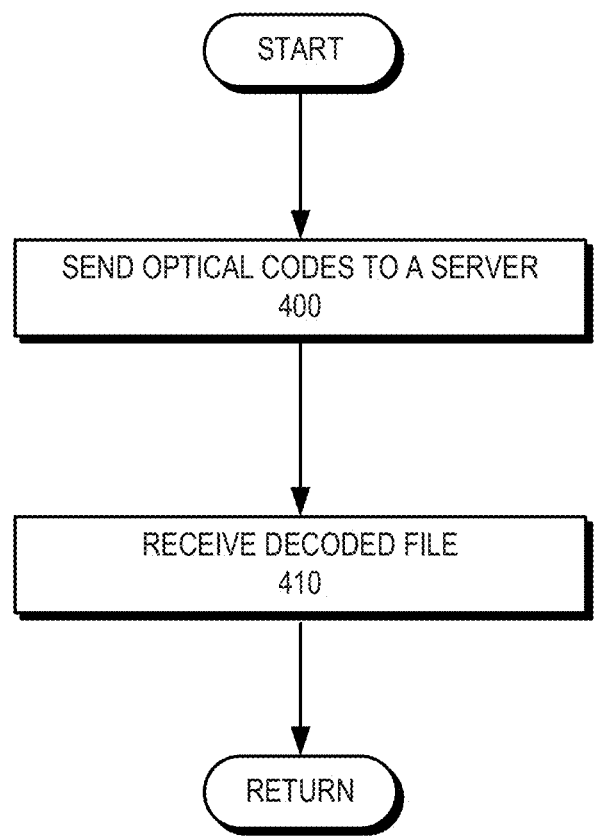
FIG. 4 presents a flow chart illustrating the process of decoding the optical codes, in accordance with an embodiment of the present invention.

FIG. 4 presents a flow chart illustrating the process of decoding the optical codes in accordance with an embodiment. During operation, the MFD sends the sequence of optical codes scanned from the display of the portable device to a server that provides a decoding service (operation 400). Next, the MFD receives the decoded file from the server and is ready for printing the document (operation 410).

In order to provide authenticity and security, a secret shared between the portable device and the decoding server may be embedded in the optical code. For example, the decoding server may combine the shared secret and other protection schemes such as passwords to decode the optical codes. The portable device may also be required to send additional information for verification, such as a hash of the optical codes, through a different channel to the server to enforce extra security.

Exemplary Portable Device

Figure 5:
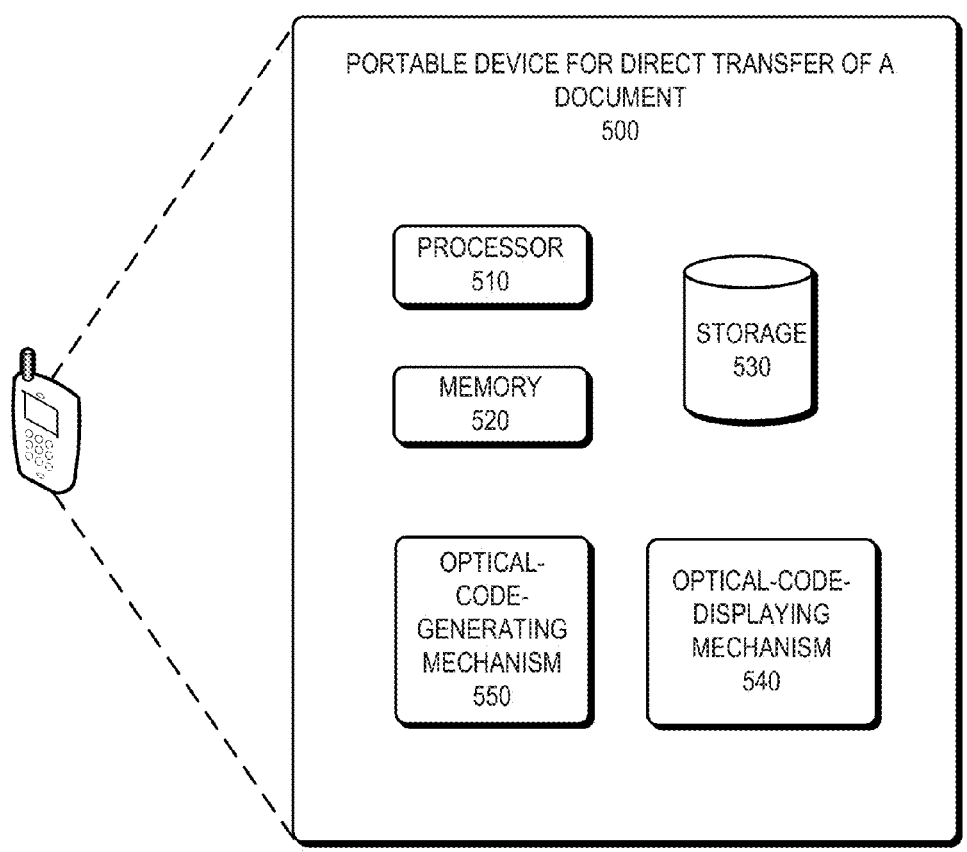
FIG. 5 illustrates an exemplary portable device for direct transfer of a document to a multi-function device, in accordance with an embodiment of the present invention.

FIG. 5 presents an exemplary portable device for direct transfer of a document from a portable device to a multi-function device in accordance with an embodiment. Portable device 500 for direct transfer of a document comprises a processor 510, a memory 520, a storage 530, an optical-code-displaying mechanism 540, and an optical-code-generating mechanism 550, all of which can be in communication with each other through various means.

Storage 530 stores programs to be executed by processor 510. Specifically, storage 530 stores a program that implements a system (application) for direct transfer of a document from a portable device to a multi-function device. During operation, the application program can be loaded from storage 530 into memory 520 and executed by processor 510. As a result, portable device 500 for direct transfer of a document from a portable device to a multi-function device can perform the functions described above.

During operation, optical-code-generating mechanism 550 obtains/generates optical codes corresponding to a document to be printed. Subsequently, optical-code-displaying mechanism 540 displays the optical codes to a scanner of the multi-function device. As a result, the printer of the multi-function device can retrieve and print the document.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for transferring a file from a portable device to a scanning device, the method comprising:
    transferring, by the portable device to the scanning device, one or more optical codes that together encode the content of the file, wherein transferring a respective optical code involves:
        displaying the respective optical code on a display of the portable device; and
        detecting that the scanning device successfully scanned the respective optical code.

2. The method of claim 1, further comprising displaying a next optical code associated with the file on the portable device, thereby allowing the scanning device to decode the file after a sequence of optical codes are scanned.

3. The method of claim 2, further comprising generating the sequence of optical codes for the file.

4. The method of claim 1, wherein detecting that the scanning device successfully scanned the respective optical code comprises waiting for a predetermined time period before displaying the next optical code by the portable device.

5. The method of claim 1, wherein detecting that the scanning device successfully scanned the respective optical code comprises detecting passing of a scanner head using a measurement from a light sensor of the portable device.

6. The method of claim 1, wherein detecting that the scanning device successfully scanned the respective optical code comprises detecting passing of a scanner head using a measurement from a touch screen of the portable device.

7. The method of claim 1, wherein detecting that the scanning device successfully scanned the respective optical code comprises allowing the scanning device to notify a user to operate the portable device to display the next optical code.

8. The method of claim 1, wherein the file is encoded in a Uuencode or multi-part Multipurpose Internet Mail Extensions (MIME) format.

9. The method of claim 1, wherein the optical code is a QR Code.

10. The method of claim 1, wherein the scanning device comprises a printer.

11. An apparatus for transferring a file from a portable device to a scanning device, the apparatus comprising:
    a display mechanism;
    a detection mechanism;
    a transferring mechanism configured to transfer, to the scanning device, one or more optical codes that together encode the content of the file, wherein transferring a respective optical code involves:
        configuring the display mechanism to display the respective optical code on the display mechanism; and
        configuring the detection mechanism to detect that the scanning device successfully scanned the respective optical code.

12. The apparatus of claim 11, wherein the display mechanism is further configured to display a next optical code associated with the file on the portable device, thereby allowing the scanning device to decode the file after a sequence of optical codes are scanned.

13. The apparatus of claim 12, further comprising an optical-code-generating mechanism configured to generate the sequence of optical codes for the file.

14. The apparatus of claim 11, wherein while detecting that the scanning device successfully scanned the respective optical code, the detection mechanism is configured to wait for a specified time period before displaying the next optical code.

15. The apparatus of claim 11, further comprising a light sensor;
    wherein while detecting that the scanning device successfully scanned the respective optical code, the detection mechanism is configured to detect passing of a scanner head using a measurement from the light sensor.

16. The apparatus of claim 11, further comprising a touch screen;
    wherein while detecting that the scanning device successfully scanned the respective optical code, the detection mechanism is configured to detect passing of a scanner head using a measurement from the touch screen.

17. The apparatus of claim 11, wherein while detecting that the scanning device successfully scanned the respective optical code, the detection mechanism is configured to allow the scanning device to notify a user to operate the portable device to display the next optical code.

18. The apparatus of claim 11, wherein the file is encoded in a Uuencode or multi-part Multipurpose Internet Mail Extensions (MIME) format.

19. The apparatus of claim 11, wherein the optical code is a QR Code.

20. A non-transitory computer-readable storage device storing instructions that when executed by a computer cause the computer to perform a method for transferring a document from a portable device to a scanning device, the method comprising:

transferring, to the scanning device, one or more optical codes that together encode the content of the file, wherein transferring a respective optical code involves:

displaying the respective optical code on a display of the portable device; and detecting that the scanning device successfully scanned the respective optical code, thereby allowing the scanning device to decode the file after a sequence of optical codes are scanned.

\* \* \* \* \*